United States Patent
Mills

(12) United States Patent (10) Patent No.: US 6,268,056 B1
Mills (45) Date of Patent: Jul. 31, 2001

(54) SEAL ASSEMBLY WITH NEW RESIN STABILIZED ADHESIVE COMPOSITION TO BOND AN INSERT MEMBER TO THE ELASTOMERIC SEAL MATERIAL

(75) Inventor: Stephen J. Mills, Plymouth, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/236,931

(22) Filed: Jan. 25, 1999

Related U.S. Application Data
(60) Provisional application No. 60/079,032, filed on Mar. 23, 1998.

(51) Int. Cl.[7] .............................. B32B 15/08; B32B 27/38
(52) U.S. Cl. ......................... 428/416; 428/418; 428/450; 428/451
(58) Field of Search .................................... 428/416, 418, 428/450, 451

(56) References Cited

U.S. PATENT DOCUMENTS 5,395,697 * 3/1995 Morrison .............................. 428/412
5,789,080 * 8/1998 Grimberg et al. ................... 428/379

\* cited by examiner

*Primary Examiner*—D. S. Nakarani
(74) *Attorney, Agent, or Firm*—Dinnin & Dunn, P.C.

(57) ABSTRACT

In a seal assembly having a support member made of either metal or plastic, and an elastomeric sealing material bonded by an adhesive composition to said support member, said composition being an epoxy resin stabilized silane adhesive composition made up from the following materials in parts by volume, (a) 1 to 80 parts organosilane material, which also includes a silane coupling agent, and a hydrolyzing agent for the organosilane, (b) 0.5 to 70 parts epoxy resin material, which includes an amine curing agent for the epoxy resin, (c) 50 to 3000 parts of aqueous fluid carrier medium for the composition, (d) 0.05 to 20 parts of additive material selected from the group consisting of a surfactant material and a rust inhibitor material.

8 Claims, 1 Drawing Sheet

SEAL ASSEMBLY WITH NEW RESIN STABILIZED ADHESIVE COMPOSITION TO BOND AN INSERT MEMBER TO THE ELASTOMERIC SEAL MATERIAL

This application is a continuation of U.S. provisional application Ser. No. 60/079,032, filed Mar. 23, 1998.

BACKGROUND OF THE INVENTION

This invention broadly relates to a new seal assembly wherein a novel resin stabilized adhesive composition is used for bonding the rubber or elastomeric seal material to a metal or plastic insert member.

The state of the prior art is indicated by the following cited references, U.S. Pat. Nos.: 3,869,340; 3,887,602; 4,052,524; 4,246,145; 4,323,488; 5,470,662; and 5,633,038.

In the past it has been known to adhesively bond insert members, such as inserts made of either metal or plastic, to a rubber or elastomer sealing material using various types of bonding adhesives. Previous aqueous organosilane adhesives tended to be very unstable and sensitive to changes in pH, temperature, and other environmental conditions. Such organosilane adhesives also provided little environmental resistance and therefore tended to de-bond or separate under numerous commonly encountered environmental conditions. Another problem with the past silane adhesives is their inability to build adequate film thickness for many required applications.

SUMMARY OF THE INVENTION

It has been unexpectedly discovered, in accordance with this invention, that through the use of water dispersable epoxy resins in formulating the adhesives composition of this invention that there has been obtained greatly improved stability and environmental resistance, and adhesive film build-up is also significantly improved. It has also been discovered that the past stability has been increased by approximately 30 times, through the use of the inventive techniques disclosed herein. The film build-up characteristics of the previously known silane adhesives has been increased by a factor of approximately five times. Also it has been found that through the use of the invention described herein the environmental resistance is greatly improved.

DESCRIPTION OF PREFERRED EMBODIMENTS AND BEST MODE

Figure 1:
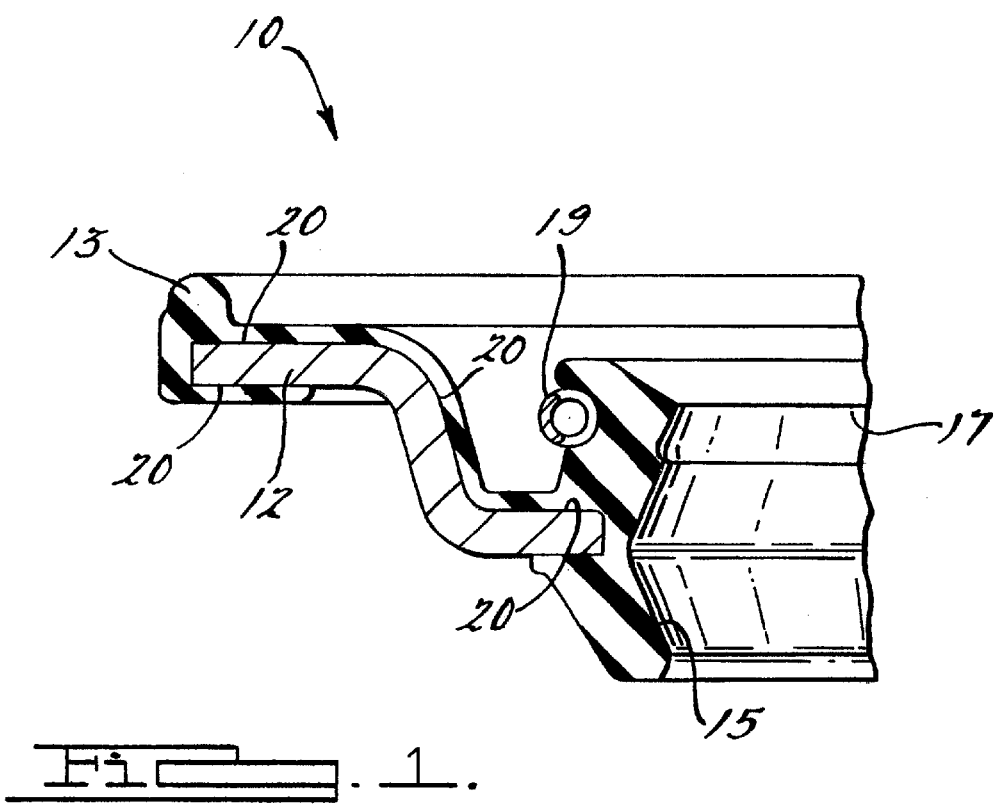
FIG. 1 shows a seal assembly in accordance with the invention.

A seal assembly in accordance with the invention is illustrated FIG. 1. The seal assembly designated 10 is comprised of a metal or plastic insert 12 which has molded therearound a rubber or elastomeric material 13. The seal assembly is shown in one-quarter sectional view as will be appreciated by those skilled in the art. The rubber or elastomeric material 13 also includes a portion thereof normally referred to as the sealing lip 15 and the excluder seal portion 17. Behind the excluder seal portion there is frequently placed a garter spring or elastic retainer member designated 19 which acts to press or secure the seal portion 17 against a circular member such as a piston, axle or strut (not shown) which is being sealed off. The surface designated 20 on the insert 12 is the entire surface of the insert which is in contact with the rubber or elastomeric material 13 therearound.

This surface portion 20 of the insert 12 is adhered to the elastomeric material 13 through the use of a unique epoxy resin stabilized silane adhesive composition. This epoxy resin stabilized silane adhesive composition, in accordance with the discovery of this invention, comprises and is made up of the following materials in parts by volume: (a) 1 to 80 parts organosilane adhesive material, which also includes a silane coupling agent, and a hydrolyzing agent for the organosilane, (b) 0.5 to 70 parts epoxy resin material, which includes an amine curing agent for the epoxy resin, (c) 50 to 3000 parts of aqueous fluid carrier medium for the composition, (d) 0.05 to 20 parts of additive material selected from the group consisting of a surfactant material and a rust inhibitor material. More preferably, the composition of the epoxy resin stabilized silane adhesive composition should be as follows: component (a) is between 2 and 60 parts, component (b) is between 1 and 55 parts, component (c) is between 60 and 1000 parts, and component (d) is between 0.1 and 10 parts. Best results are obtained when: component (a) is between 3 and 20 parts, component (b) is between 2 and 15 parts, component (c) is between 100 and 700 parts, and component (d) is between 0.2 and 8 parts.

The epoxy resin stabilized silane adhesive composition is applied to the metal insert (or in some cases it may be a plastic insert) of the seal assembly 10 on the surface thereof designated 20 at a thickness of approximately 0.05 mils, and the adhesive is then dried with hot air (for about 15 minutes at about 300° F.). The rubber seal is subsequently molded over the insert, and the adhesive is cured at the same time that the rubber (or elastomeric material) is cured and set up on the insert 12.

In order to further illustrate the invention, the following examples are provided; however, they are not intended to be limiting on the scope of the invention as set forth in the subjoined claims.

Example 1
Phosphatizer Apparatus Used=750 gallons size≈2850 Liters

| Ingredients | Description |
| --- | --- |
| Tergitol NP-6 [Surfactant, Non-Ionic, Nonyphenol Polyethylene Glycol Ether] | |
| | ~97% — Nonylphenol Ethoxylate |
| | ~1.5% — Polyethylene Glycol |
| | ~1.5% — Dinonylphenol Ethoxylate |
| Si-264 | Organosilane, 3-Thiocyanatopropyltriethoxysilane $(C_2H_5O)_3$ Si —$(CH_2)_3$ — SCN (available from DeGussa Co.) |
| A1100 | Silane Coupling Agent, 3-Aminapropyltriethoxysilane (O.S.I. Co.) |
| Z6020 | Silane Coupling Agent, 3-(Z-Aminoethylamino)propyltrimethoxysilane (Dow Corning Co.) |
| Acetic Acid | $CH_3COOH$ (hydrolyzing agent for the organosilane) |
| CF Rinse | Rust Inhibitor |
| MIXING INSTRUCTIONS | |
| Added: | ~2795 L of Water (L = liter) |
| | .85 L of Tergitol |
| | 7 L of Acetic Acid |
| | 25.5 L of Si264 |
| Agitate for 24 hours | |
| Check pH: (3.0–3.3) | Actual = 3.2 |
| Added: | 4 L of A1100 |
| | 4 L of Z6020 |
| Agitate for 2 hours | |
| Added: | 14 L of CF Rinse |
| Check pH: (4.0–4.5) | Actual = 4.4 |
| Ran parts through the phosphatizer | |

-continued

| P/N | Compound | Initial Bond Results; R/R Tear |
|-----|----------|-------------------------------|
| 33394 | A0706 | 100 |
| 35866 | A0806 | 100 |
| 35125 | K0707 | 100 |
| 37613 | P0814 | 100 |

The adhesive is applied to the metal insert (or in some cases plastic insert) of the seal assembly at a thickness of about 0.05 mils, and the adhesive is then dried with hot air (15 min. at 300° F.). The rubber seal is subsequently molded over the insert, and the adhesive is cured at the same time that the rubber (or elastomeric material) is cured and set upon the insert.
Shelf life of treated cases was performed on P/N 35866
The bond was good for 21 days.

Example 2

| EPI-REZ 3515-260 | Waterborne Resin, Nonionic, Aqueous Dispersion of a bisphenol A epoxy resin (Shell Oil Co.) |
|---|---|
| EPI-REZ 3510-W-60 | Waterborne Resin, Nonionic, Aqueous Dispersion of A bisphenol A epoxy resin (Shell Oil Co.) |
| EPI-CURE 3055 | Aliphatic Amidoamine Curing Agent (Shell Oil Co.) |
| EPI-CURE 3253 | Tertiary Amine Curing Agent (Shell Oil Co.) |

Determination of the effectiveness of the resins on the stability of the Adhesive; mixed 3 lab Batches.
    LAB BATCH 1: No Resin or Curative
    LAB BATCH 2: 3510 Resin & 3253 Curative
    LAB BATCH 3: 3515 Resin & 3055 Curative

| The mixing procedure was as follows: | Amount (ml) | | |
|---|---|---|---|
| | 1 | 2 | 3 |
| Mix while agitating: | | | |
| Water | 483 | 478 | 478 |
| ½ of Curative | 0 | .5 | .5 |
| Tergitol (surfactant) | .2 | .2 | .2 |
| Acetic Acid (hydrolyzing agent) | 2.4 | 2.4 | 2.4 |
| Si264 (organosilane) | 4 | 4 | 4 |
| Agitate 4 hours | | | |
| Add: Resin | 0 | 2.5 | 2.5 |
| Agitate for 20 hours | | | |
| Check pH: should be 3.0–3.3 | | | |
| Add: A1100 (silane coupling agent) | 4 | 4 | 4 |
| Z6020 (silane coupling agent) | 4 | 4 | 4 |
| Agitate 2 hours | | | |
| Add: CF Rinse (rust inhibitor) | 2.5 | 2.5 | 2.5 |

Example 3
Resin Stabilized Waterborne Silane Adhesive

| Mixing Procedure | Amount (ml) |
|---|---|
| Add while agitating mildly | 300 ml H₂O |
| | .5 ml Tergitol |
| | 1.5 ml Acetic Acid |
| | 3.0 ml Si264 |
| Agitate for 4 hours | |
| Then add: | 6.0 ml 3515 |
| | 6.0 ml 3510 |
| | 2.2 ml A1100 |
| | 2.8 ml Z6020 |
| | 15 ml Ultraseal |
| | 1.7 ml CF Rinse |
| Check pH: 3.9 Added 2 ml Acetic Acid | |
| pH: 3.1-o.k. | |
| Agitate for 24 hours | |
| Then add: | 1.5 ml 3055 |
| | 1.5 ml 3253 |
| Agitated for 24 hours (4 hours should be sufficient) | |
| Check pH: 4.35 o.k. | |

Treated panels with the adhesive and molded bond panels.

Example 4

Resin-Stabilized Silane Adhesive
See ingredients listed on pages 154, 011–015.

| Mixing Procedure | Amount (ml) |
|---|---|
| Mix while agitating mildly: | 295 ml H₂O |
| | 5 ml Tergitol |
| | 1.5 ml Acetic Acid |
| | 3.75 ml Si264 |
| pH = 2.5 | |
| Mix separately: Silane Mixture | 2.5 ml A1100 |
| | 3.5 ml Z6020 |
| | 6 ml H₂O |
| Agitate for 4 hours | |
| Add while agitating: | 10.0 ml 3515 |
| | 10.0 ml 3510 |
| | 12.0 Silane Mixture |
| | 15 ml Ultraseal |
| | 2 ml CF Rinse |
| Agitate for 4 hours | |
| pH = 4.15 | |
| Agitate 20 hours & | |
| Add while agitating: | 4 ml 3055 |
| | 1 ml 3253 |
| Agitate 15 mins. | |
| pH = 4.2 | |

While it will be apparent that the preferred embodiments of the invention disclosed are well calculated to fulfill the objects, benefits, or advantages of the invention, it will be appreciated that the invention is susceptible to modification, variation, and change without departing from the proper scope or fair meaning of the subjoined claims:
What is claimed is:
1. In a seal assembly having a support member made of either metal or plastic, and an elastomeric sealing material bonded by an adhesive composition to said support member, said composition being an epoxy resin stabilized silane adhesive composition made up from the following materials in parts by volume,
    (a) 1 to 80 parts of a first organosilane material comprising 3-thiocyanatopropy triethoxy silane mixed with a second organosilane material which is different from the first organosilane material, and a organic acid hydrolyzing agent for the organosilane, said second organosilane material being selected from the group consisting of 3-aminopropyltriethoxysilane, 3-(2-aminoethyl amino) propyltrimethoxysilane and mixtures thereof, (b) 0.5 to 70 parts epoxy resin material, which includes an amine curing agent for the epoxy resin, (c) 50 to 3000 parts of aqueous fluid carrier medium for the composition, (d) 0.05 to 20 parts of a surfactant material.

2. The invention of claim 1 wherein, component (a) is between 2 and 60 parts, component (b) is between 1 and 55 parts, component (c) is between 60 and 1000 parts, and component (d) is between 0.1 and 10 parts.

3. The invention of claim 1 wherein, component (a) is between 3 and 20 parts, component (b) is between 2 and 15 parts, component (c) is between 100 and 700 parts, and component (d) is between 0.2 and 8 parts.

4. A seal assembly having a support member made of either metal or plastic, and an elastomeric sealing material bonded by an adhesive composition to said support member, said composition being an epoxy resin stabilized silane adhesive composition comprising in parts by volume, (a) 1 to 80 parts of a first organosilane material comprising 3-thiocyanatopropy triethoxy silane mixed with a second organosilane material which is different from the first organosilane material, and a organic acid hydrolyzing agent for the organosilane, said second organosilane material being selected from the group consisting of 3-aminopropyltriethoxysilane, 3-(2-aminoethyl amino) propyltrimethoxysilane and mixtures thereof, (b) 0.5 to 70 parts epoxy resin material, which includes an amine curing agent for the epoxy resin, and (c) 50 to 3000 parts of aqueous fluid carrier medium for the composition.

5. The invention of claim 4 wherein, component (a) is between 2 and 60 parts, component (b) is between 1 and 55 parts, component (c) is between 60 and 1000 parts.

6. The invention of claim 4 wherein, component (a) is between 3 and 20 parts, component (b) is between 2 and 15 parts, component (c) is between 100 and 700 parts.

7. The invention of claim 4 wherein, said seal assembly uses a metal insert, which has a surface portion thereof in contact with the elastomeric sealing material.

8. The invention of claim 7 wherein, said elastomeric sealing material is rubber.

* * * * *